United States Patent
Kern et al.

(10) Patent No.: US 9,195,308 B2
(45) Date of Patent: Nov. 24, 2015

(54) OPERATING DEVICE

(75) Inventors: Alexander Thorsten Kern, Alsbach (DE); Ingo Zoller, Hoesbach (DE)

(73) Assignee: Continental Automotive GmbH, Hannover (DE)

(*) Notice: Subject to any disclaimer, the term of this patent is extended or adjusted under 35 U.S.C. 154(b) by 18 days.

(21) Appl. No.: 14/234,893

(22) PCT Filed: Jul. 23, 2012

(86) PCT No.: PCT/EP2012/064427
§ 371 (c)(1),
(2), (4) Date: Feb. 12, 2014

(87) PCT Pub. No.: WO2013/014129
PCT Pub. Date: Jan. 31, 2013

(65) Prior Publication Data
US 2014/0176478 A1   Jun. 26, 2014

(30) Foreign Application Priority Data

Jul. 25, 2011  (DE) .......................... 10 2011 079 711

(51) Int. Cl.
| | |
|---|---|
| *G06F 3/041* | (2006.01) |
| *G06F 3/01* | (2006.01) |
| *G06F 3/0346* | (2013.01) |
| *G06F 3/0488* | (2013.01) |
| *H01F 7/06* | (2006.01) |

(52) U.S. Cl.
CPC ................ *G06F 3/016* (2013.01); *G06F 3/011* (2013.01); *G06F 3/0346* (2013.01); *G06F 3/0488* (2013.01); *H01F 2007/068* (2013.01)

(58) Field of Classification Search
None
See application file for complete search history.

(56) References Cited

U.S. PATENT DOCUMENTS

| | | |
|---|---|---|
| 4,808,955 A | 2/1989 | Godkin et al. |
| 6,169,469 B1 | 1/2001 | Misumi et al. |
| 2005/0038944 A1 | 2/2005 | Harada et al. |
| 2005/0237314 A1* | 10/2005 | Ryynanen ..................... 345/184 |
| 2006/0109254 A1 | 5/2006 | Akieda et al. |
| 2006/0119586 A1 | 6/2006 | Grant et al. |
| 2006/0256075 A1 | 11/2006 | Anastas et al. |
| 2008/0044044 A1* | 2/2008 | Madaffari et al. ............ 381/186 |
| 2008/0060856 A1* | 3/2008 | Shahoian et al. .......... 178/18.03 |

(Continued)

FOREIGN PATENT DOCUMENTS

| | | |
|---|---|---|
| DE | 196 38 015 | 3/1998 |
| DE | 10 2010 007 486 | 8/2011 |
| EP | 1 310 860 | 5/2003 |

(Continued)

*Primary Examiner* — Muhammad N Edun
(74) *Attorney, Agent, or Firm* — Cozen O'Connor

(57) ABSTRACT

An operator control apparatus has an operator control element with haptic feedback. The operator control element has an input area and can be operated by an operator using an input member. The operator control apparatus includes a first and second ferromagnetic areal components and a first and second flat coils that are arranged between the first and second components. The first and second components have their largest areas oriented toward each other and are configured to move relative to each other. The input area is either configured as a part of the first or second component or coupled to the first or second component using a coupling apparatus. The first coil is associated with the first component and the second coil is associated with the second component such that a flow of current through the first and second coils causes the first and second components to move.

13 Claims, 3 Drawing Sheets

(56) References Cited

U.S. PATENT DOCUMENTS

2011/0169347 A1   7/2011  Miyamoto et al.
2012/0306798 A1   12/2012 Zoller et al.

FOREIGN PATENT DOCUMENTS

FR    2 894 061     6/2007
JP    2002-351306   12/2002

* cited by examiner

//  OPERATING DEVICE

CROSS-REFERENCE TO RELATED APPLICATIONS

This is a U.S. national stage of PCT Application No. PCT/EP2012/064427, filed on 31 Jan. 2013, which claims priority to German Patent Application No. 10 2011 079 711.4, filed on 25 Jul. 2011, each of which is hereby incorporated in its entirety by reference.

FIELD OF THE INVENTION

The invention relates to an operator control apparatus having an operator control element with haptic feedback, wherein the operator control element can be operated by an operator by means of an input member.

DESCRIPTION OF THE RELATED ART

Haptic feedback from operator control elements is required above all when an operator cannot directly perceive the operator control process that he is executing. Although, in the case of operator control apparatuses having electromechanical switches, an operator is able to perceive the opening or closing of the switching contacts by virtue of changing haptics from the operator control element, this is not necessarily existent in the case of electronic switches. Therefore, operator control elements are known in the prior art that use movements of the operator control element that are perceptible to the operator to provide haptic feedback about an operator control process that has taken place.

Known haptic operator control elements, for example those known as touch screens, require a large installation space, an elaborate drive and special design measures if, by way of example, they are intended to be used in an environment that is characterized by particularly large temperature differences, for example in motor vehicles that are intended to maintain their operability both in arctic cold and in summer heat.

Prior German application DE 10 2010 007 486.1 describes an operator control apparatus of this kind that has two ferromagnetic areal components and a flat coil, wherein the ferromagnetic areal components have their largest areas oriented toward each other and can move relative to each other and wherein the flat coil is arranged between the ferromagnetic areal components. In this case, the input area is either in the form of a part of one of the ferromagnetic areal components or is coupled to one of the ferromagnetic components by means of a coupling apparatus. The ferromagnetic areal components can move toward each other as a result of a flow of current through the flat coils, as a consequence of which the movement of one of the ferromagnetic areal components is perceptible directly or by means of a coupling apparatus to the sense of touch of the operator on the operator control element. A two-area component can be used to produce only a movement away from the user.

SUMMARY OF THE INVENTION

It is therefore an object of the invention to specify an operator control apparatus having an operator control element with haptic feedback that requires little installation space, is of simple design and in the input area can be moved both toward and away from the operator. This object is achieved by an operator control apparatus having an operator control element with haptic feedback. The operator control element has an input area and can be operated by an operator by means of an input member. The operator control apparatus has a first and a second ferromagnetic areal component and a first flat coil. The first and second ferromagnetic areal components have their largest areas oriented toward each other and can move relative to each other. The first flat coil is arranged between the first and second ferromagnetic areal components. The input area is either in the form of a part of the first or second ferromagnetic areal component, or it is coupled to the first or second ferromagnetic areal component by means of a coupling apparatus. A second flat coil is arranged between the first and second ferromagnetic areal components. The first flat coil is associated with the first ferromagnetic areal component and the second flat coil is associated with the second ferromagnetic areal component, such that the flow of current through the first and second flat coils can cause the first and second ferromagnetic areal components to move toward or away from each other. The movement of the first or second ferromagnetic areal component is perceptible directly or by means of the coupling apparatus to the sense of touch of the operator on the operator control element.

Since the first ferromagnetic areal component and the second ferromagnetic areal component each has at least one associated coil, the two ferromagnetic areal components attract one another or repel one another, depending on what magnetic field the respective coils set up. Thus, when the flat coils are carrying current, the input area moves either toward the operator or away from the operator. Hence, more effective haptic effects can be produced than if the operator control element is limited to initially move away from the operator as a result of the coils carrying current. By way of example, the flat coils may comprise wound, insulated, conductive wires that are in a spiral form.

Operating safety and reliability is increased if the first flat coil is firmly connected to the first ferromagnetic areal component and the second flat coil is firmly connected to the second ferromagnetic areal component. This can be implemented by bonding the respective flat coils to the respective ferromagnetic areal component, for example. The flat coils and the firm connection thereof to the areal ferromagnetic components can be produced particularly easily if the first and second flat coils are produced from conductive tracks on a respective printed circuit board. This printed circuit board may then be connected to the respective areal ferromagnetic component by adhesive bonding, riveting or by other known connecting measures.

If the first and second flat coils are arranged on two sides of the respective printed circuit board, particularly compact flat coils are produced. If the first and second flat coils each has a ferromagnetic coil core, the magnetic flux is directed and the action of force is increased. These coil cores can be produced particularly easily if they are in the form of part of the respective first or second ferromagnetic areal component. If the first and second ferromagnetic areal components each has a plurality of flat coils associated with it, the force with which the areal ferromagnetic components are brought together or repelled can be increased.

If the operator control apparatus has an elastic element that defines the distance of the ferromagnetic area of the components in relation to each other when the flat coils carry no current, it is possible for operator control of the operator control element by the input member to be ascertained provided that the operator control apparatus has a distance apparatus for measuring the distance between the first ferromagnetic areal component and the second ferromagnetic areal component. If an alteration in the distance is measured in this manner, it can be assumed that the distance has been altered by the operator control member and thus operator control of the operator control element can be confirmed. This measuring apparatus can be produced using simple means, for example, by virtue of it being in the form of a measuring device for measuring the inductance of the flat coils. Thus, no additional path measuring means is required. Instead, an already existing flat coil can be used by simply measuring its inductance by means of an electronic circuit, for example a microcomputer, that is designed and already existing for actuating the operator control apparatus and possibly miscellaneous further appliances.

The distance of the ferromagnetic areal components in relation to each other can likewise be easily measured capacitively. To this end, by way of example, a printed circuit board on which the first and/or second flat coil are/is arranged may hold two additional conductive areas, the capacitance of which changes as a result of a change of distance of the ferromagnetic areal components in relation to the printed circuit board. In this way, it is possible to infer the distance of the two ferromagnetic areal components. The two conductive areas can be produced at the same time as the flat coils are produced by etching a copper-lined printed circuit board or by printing with a conductive paste and thus require only minimal additional modification. The flat coils can likewise be used for capacitance measurement so long as they still carry no current.

The operator control element may be in the form of a display, for example. In the simplest case, this display can be embodied, by way of example, by printing with various digits, for example in the form of a telephone keypad. By way of illustration, it is thus possible to select various digits when the operator control member is used to touch the operator control element at the relevant digit and the display has an appropriate apparatus that can be used to determine the position of the input member on the display. If the previously described display is in the form of an electro-optical display, various menus, submenus or single values can be presented on the display that is detected by virtue of the display being correspondingly touched at the relevant position of the presentation of the menu, submenu or value that is to be selected. The optoelectronic displays may be in the form of a light emitting diode matrix, an organic light emitting diode display or a liquid crystal display, for example, and are known as "touch screens".

The flat coils carry direct current in order to move the areal ferromagnetic components toward one another, this direct current being able to have its polarity reversed in one of the two coils at short intervals, so that the distances of the ferromagnetic areal components in relation to one another change. In addition, this current can be modulated with a frequency in the audio range, such as one kilohertz, so that this frequency is additionally audible. For example, a click may be audible that sounds as though a mechanical switch has been opened or closed.

Finally, the coil cores for the flat coils can be produced by deforming the ferromagnetic areal components, for example by deep drawing or sinking. This further simplifies construction and reduces the cost thereof.

BRIEF DESCRIPTION OF THE DRAWINGS

The invention is explained in more detail below with reference to the figures. In the figures.

DETAILED DESCRIPTION OF THE PREFERRED EMBODIMENTS

Figure 1:
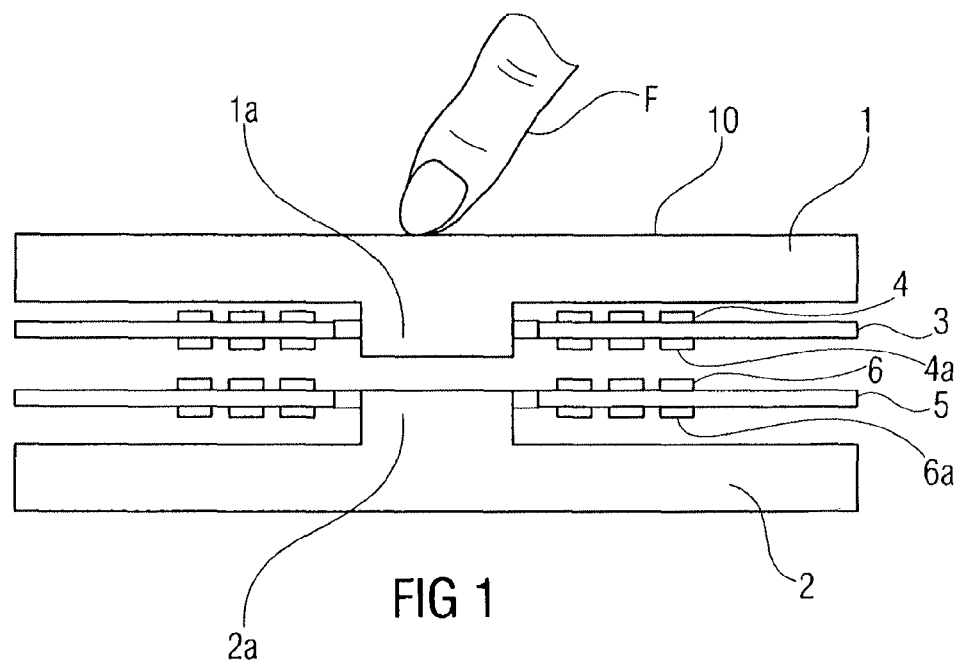
FIG. 1 shows the fundamental design of a first exemplary embodiment of the operator control apparatus in accordance with one embodiment of the invention.

FIG. 1 depicts a first ferromagnetic areal component 1 having an elevation 1a, a second ferromagnetic areal component 2 having an elevation 2a, a first printed circuit board 3 having a flat coil 4, of which twelve sections 4a through the individual turns are shown, a second printed circuit board 5 having a second flat coil 6, of which likewise twelve sections 6a through the individual conductor tracks of the second flat coil are shown. The elevation 1a of the ferromagnetic areal component 1 acts as a coil core for the first flat coil 4, and the elevation 2a of the second ferromagnetic areal component 2 acts as a coil core for the second flat coil 6. When the first and second flat coils carry current, a respective magnetic field is produced in the first ferromagnetic areal component 1 and in the second ferromagnetic areal component 2. The electromagnets thus produced from the ferromagnetic areal components 1, 2 and flat coils 4, 6 attract one another or repel one another depending on the magnetic fields produced, as a result of which the ferromagnetic areal component 1 moves away from the input member (e.g., finger) F an operator when the ferromagnetic areal components attract one another and presses itself against the finger F when the two ferromagnetic areal components repel one another. In FIG. 1, one side of the first ferromagnetic areal component 1 is used as an input area 10.

Figure 2:
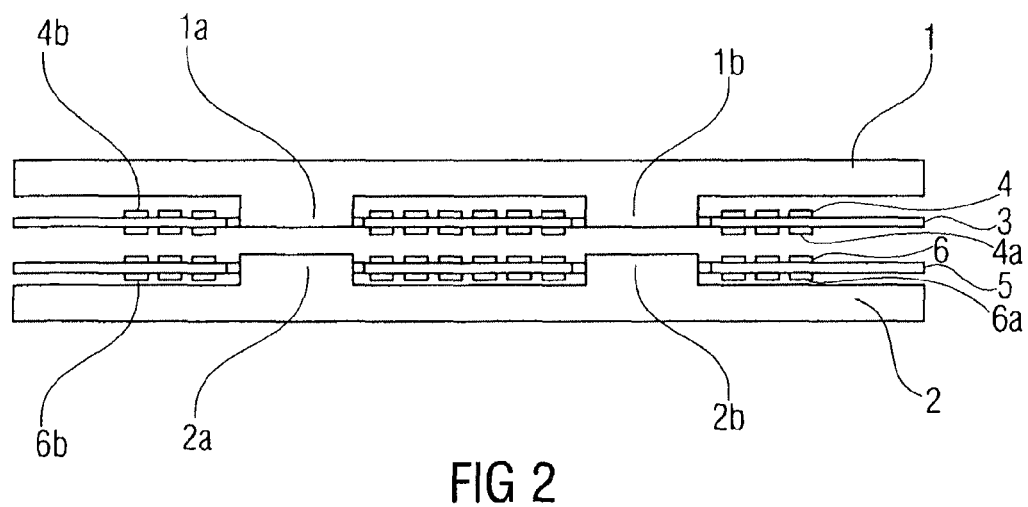
FIG. 2 shows a section through a modified exemplary embodiment similar to that shown in FIG. 1.

In the case of the modified exemplary embodiment in FIG. 2, the first ferromagnetic areal component 1 has a further elevation 1b and the second ferromagnetic areal component 2 additionally has an elevation 2b. Furthermore, the first printed circuit board 3 additionally has turns 4b of an additional first flat coil 4 and the second printed circuit board 5 has additional turns 6b of an additional second flat coil 6. In this context, it is possible to attain regularization of the magnetic forces that occur for larger dimensions of the input area.

Figure 3:
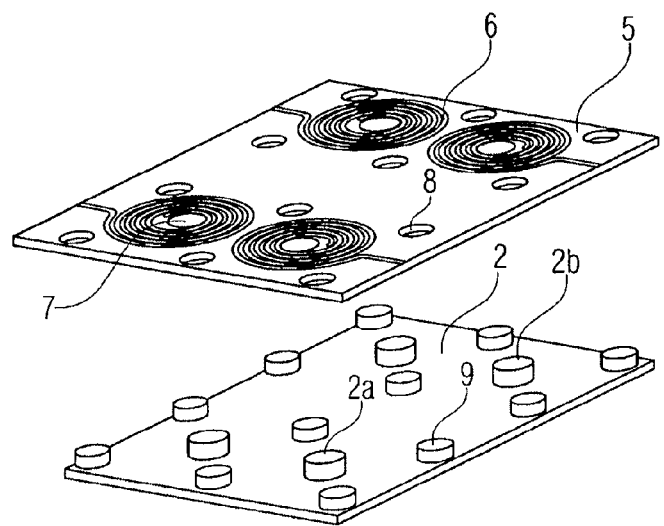
FIG. 3 shows an elevated perspective view of a second ferromagnetic areal component and of a printed circuit board.

FIG. 3 depicts a further exemplary embodiment of a second ferromagnetic areal component 2 and a second printed circuit board 5. The ferromagnetic areal component 2 has a total of four elevations 2a, 2b. In addition, twelve elastic elements 9 are shown, which may be in the form of silicone cylinders, for example. The second printed circuit board 5 has four second flat coils 6 with one opening 7 each, which flat coil openings are designed to receive the elevations 2a, 2b. In addition, twelve openings 8 through which the elastic elements 9 project can be seen in the second printed circuit board 5. The first printed circuit board 3 associated with this exemplary embodiment and the associated first ferromagnetic areal component 1 are of corresponding design.

Figure 4:
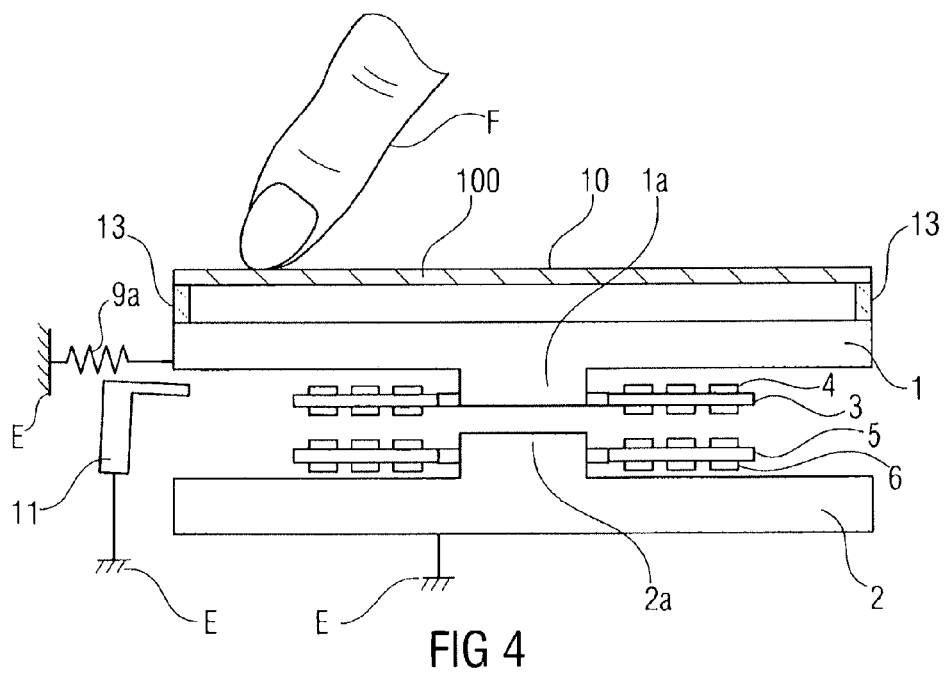
FIG. 4 shows a section through a further exemplary embodiment of the invention.

The exemplary embodiment shown in FIG. 4 contains not only the components already described in FIG. 1 but additionally a touch screen 100 having an operator control element in the form of an input area 10, a stop 11 and an elastic element 9a. The touch screen 100 with the input area 10 is coupled to the first ferromagnetic areal component 1 by means of coupling elements in the form of webs 13. The ground symbols E denote that the components connected to the ground symbols, in this case the second ferromagnetic areal component 2, the elastic element 9a and the stop 11, take up a fixed defined position. In the zero-current state of the flat coils 3 and 6, the elastic element 9a defines the position of the first ferromagnetic areal component 1 and hence of the touch screen 100 when no external force is applied, for example, by the finger F of an operator. When the flat coils 4, 6 carry current, the first ferromagnetic areal component 1 and hence the input area 10 with the touch screen 100 move in the direction toward the finger F of the operator or away from the finger F of the operator, depending on the direction of current flow. This movement is perceptible to an operator. Since the coils carry current such that the first and second ferromagnetic areal components 1, 2 repeatedly move toward and away from each other, different information can be reported back to the operator in the case of a different embodiment.

Figure 5:
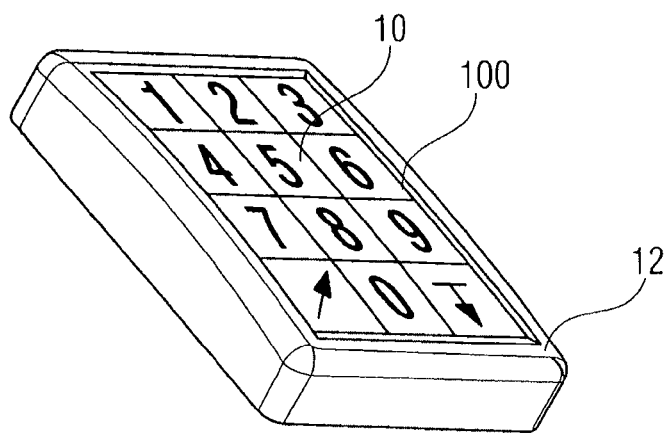
FIG. 5 shows a view of an exemplary embodiment incorporated into a housing.

FIG. 5 depicts an exemplary embodiment of an operator control apparatus according to the invention in an elevated perspective view. By way of example, the touch screen 100 has an electro-optical display, such as a liquid crystal display or a light emitting diode display. In FIG. 5, the electro-optical display presents a telephone keypad. Alternatively, the electro-optical display can also present other information, such as operator control menus or individually adjustable operator control values. The components shown in the preceding figures are also incorporated inside the housing 12 and underneath the operator interface 10.

While there have shown and described and pointed out fundamental novel feature of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An operator control apparatus having an operator control element with haptic feedback, wherein the operator control element has an input area and can be operated by an operator using an input member, the operator control apparatus comprising:
   a first ferromagnetic areal component having a first elevation;
   a second ferromagnetic areal component having a second elevation, wherein said first and second ferromagnetic areal components have their largest areas oriented toward each other and are configured to move relative to each other;
   a first printed circuit board having a first flat coil arranged thereon and having a first coil opening; and
   a second printed circuit board having a second flat coil arranged thereon and having a second coil opening, said first and second printed circuit boards, and said first and second flat coils, being arranged between said first and second ferromagnetic areal components,
   wherein said first coil opening is configured to receive said first elevation such that the first elevation forms a ferromagnetic coil core of said first flat coil and said second coil opening is configured to receive said second elevation such that the second elevation forms a ferromagnetic coil core of said second flat coil, wherein when said first and second flat coils carry current, a respective magnetic field is produced in said first and second ferromagnetic areal components, such that a flow of current through each of said first and second flat coils causes at least one of said first and second ferromagnetic areal components to move toward and away from each other,
   wherein the input area is either configured as a part of said first or second ferromagnetic areal component or coupled to said first or second ferromagnetic areal component using a coupling apparatus, and
   wherein said movement of one of said first and second ferromagnetic areal components is perceptible to a sense of touch of the operator on the operator control element either directly or through said coupling apparatus.

2. The operator control apparatus of claim 1, wherein said first flat coil is firmly connected to said first ferromagnetic areal component and said second flat coil is firmly connected to said second ferromagnetic areal component.

3. The operator control apparatus of claim 1, wherein said first and second flat coils comprise conductive tracks on said respective first and second printed circuit board.

4. The operator control apparatus of claim 3, wherein said first and second flat coils are arranged on two sides of said respective first and second printed circuit boards.

5. The operator control apparatus of claim 1, wherein each of said first ferromagnetic areal component and said second ferromagnetic areal component has a plurality of associated flat coils.

6. The operator control apparatus of claim 1, further comprising an elastic element that defines a distance between said first elevation of said first ferromagnetic areal component and said second elevation of second ferromagnetic areal component when said first and second flat coils carry no current.

7. The operator control apparatus of claim 1, wherein the operator control element comprises a display.

8. The operator control apparatus of claim 7, wherein said display includes an apparatus for determining a position of the input member on said display.

9. The operator control apparatus of claim 7, wherein said display comprises an electro-optical display.

10. The operator control apparatus of claim 1, wherein said current flow through each of said first and second flat coils comprises a current that is modulated in an audio frequency range applied to each of said first and second flat coils.

11. The operator control apparatus 1, wherein said ferromagnetic coil cores are produced by deforming said first and second ferromagnetic areal components.

12. An operator control apparatus having an operator control element with haptic feedback, wherein the operator control element has an input area and can be operated by an operator using an input member, the operator control apparatus comprising:
   a first ferromagnetic areal component and a second ferromagnetic areal component, wherein said first and second ferromagnetic areal components have their largest areas oriented toward each other and are configured to move relative to each other;
   a first flat coil and a second flat coil arranged between said first and second ferromagnetic areal components; and
   a distance measuring apparatus for measuring a distance between said first ferromagnetic areal component and said second ferromagnetic areal component,
   wherein the input area is either configured as a part of said first or second ferromagnetic areal component or coupled to said first or second ferromagnetic areal component using a coupling apparatus, wherein said first flat coil is associated with said first ferromagnetic areal component and said second flat coil is associated with said second ferromagnetic areal component such that a flow of current through each of said first and second flat coils causes at least one of said first and second ferromagnetic areal components to move toward and away from each other, and wherein said movement of one of said first and second ferromagnetic areal components is perceptible to a sense of touch of the operator on the operator control element either directly or through said coupling apparatus.

13. The operator control apparatus of claim 12, wherein said distance measuring apparatus is configured to measure a change in inductance of said first and second flat coils.

* * * * *